Sept. 29, 1964  S. H. BUTT  3,150,445
METHOD OF REMOVING ATMOSPHERE AND THEN PRESSURE WELDING
Filed Oct. 4, 1960  2 Sheets-Sheet 1

INVENTOR.
SHELDON H. BUTT
BY
ATTORNEYS

Sept. 29, 1964     S. H. BUTT     3,150,445
METHOD OF REMOVING ATMOSPHERE AND THEN PRESSURE WELDING
Filed Oct. 4, 1960     2 Sheets-Sheet 2
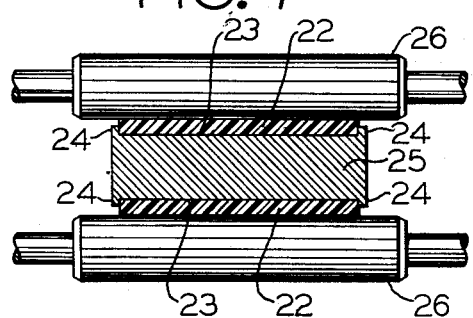
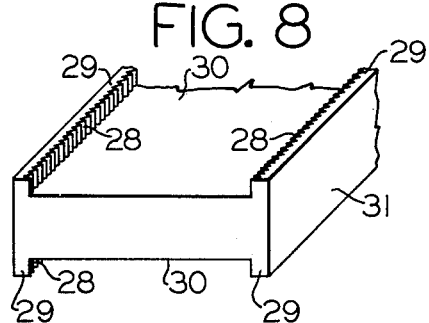
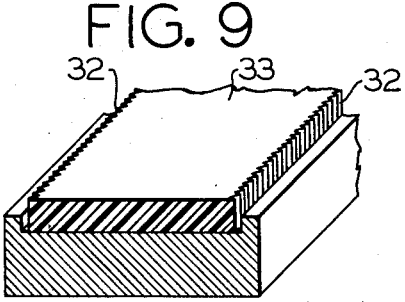
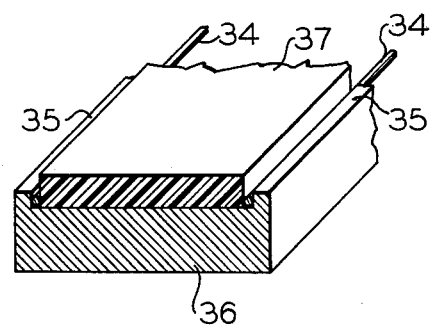
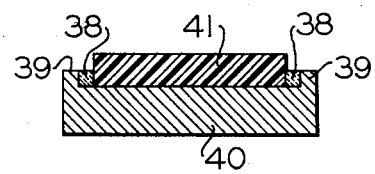
INVENTOR.
SHELDON H. BUTT
ATTORNEYS

United States Patent Office 3,150,445
Patented Sept. 29, 1964

3,150,445
METHOD OF REMOVING ATMOSPHERE AND
THEN PRESSURE WELDING
Sheldon H. Butt, Westport, Conn., assignor to Olin
Mathieson Chemical Corporation, East Alton, Ill., a
corporation of Virginia
Filed Oct. 4, 1960, Ser. No. 60,398
16 Claims. (Cl. 29—471.5)

This invention relates to clad metals and particularly to the formation of composite assemblies adapted for pressure welding.

In the cladding of metal by pressure welding a facing or cladding component to a base or core component, it is sometimes necessary to prepare an assembly of components, to be welded together, in such a manner as to substantially prevent the presence of oxidizing atmospheres such as air between the adjacent surfaces of the components during and subsequent to heating preparatory to pressure welding, and sometimes prior to the generation of the pressure weld by rolling or forging. For example, the presence of air between the adjacent surfaces of components of which is comprised of copper or chrome steel results in the oxidation of this component to render the obtainment of the components either difficult or impossible.

Various methods have been proposed to overcome this difficulty. One method is sealing the adjacent surfaces of a pack of superimposed components by a continuous weld about the peripheral edges of the components. However, despite the considerable cost and the skill necessary to obtain a successful weld, air still remains trapped between the components for oxidation thereof when the assembly is heated to pressure welding temperatures.

Another method comprises placing the facing element or component within a recess, of equal or greater depth than the thickness of the facing component, provided in the backing or core component. Thereafter, the projecting edges of flanges, defining the recess, of the core of the backing component are peened against the facing component in an attempt to obtain an intimate contact therebetween so as to form a seal against external atmospheres. This method suffers from a disadvantage that a recess in the surface of the core or backing component has to be approximately equal or greater depth than the thickness of the facing component generating substantial quantities of undesired scrap adding to the cost of the process. Furthermore, the peening operation is relatively expensive and unless performed with particular skill so as to obtain a continuous intimate contact between the components results in the ingress or penetration of air between the components resulting in oxidation of the welding surfaces of the components during the heating and pressure welding operations. Furthermore, this process likewise retains air trapped between the components which oxidize the welding surfaces thereof.

A modification proposed for the latter method involves the insertion of the facing component in a recess of a backing component defined between projecting flanges thereon. After insertion the flanges are upset by edge rolling so as to be squeezed against the edges of the faces of the components. The process is not only limited to the use of facing components softer and more ductile than the backing or core component, but in addition, also retains entrapped air between the various components causing oxidation of their welding surfaces when an assembly of the components is heated to pressure welding temperatures and subjected to pressure welding operations.

Accordingly, it is an object of this invention to provide a novel process eliminating disadvantages of the prior art.

Another object of this invention is to provide a novel process for assembling a plurality of components to be welded together in a manner substantially preventing oxidation of adjacent surfaces.

A still another object of this invention is to provide a novel process substantially preventing penetration of air between components assembled for pressure welding.

Other objects and advantages will become more apparent from the following description and drawings in which:

FIGURE 7 is an elevational view partly in section illustrating a mechanical working of an assembly of superimposed sheets in accordance with a still another embodiment of this invention;

FIGURE 8 is a perspective view of a component employed with a further embodiment of applicant's invention;

FIGURE 9 is a perspective view partly in section illustrating a variation of the embodiment of applicant's invention depicted in FIGURE 8;

FIGURE 10 is a perspective view of an assembly of metal components to be processed in accordance with a still further embodiment of applicant's invention; and FIGURE 11 is an elevational view illustrating an assembly of components in accordance with a further embodiment of applicant's invention.

Generally speaking, the aforesaid objects and advantages are obtained by assembling a plurality of metal components which are to be pressure welded together in a manner which adapts the assembly to a mechanical working and produces plastic deformation which urges the metal components into intimate engagement or contact in all their adjacent areas with sufficient force to squeeze out all atmospheres, such as air, between them. This is accomplished in accordance with this invention by providing a shallow recess into one of a pair of opposed faces of the backing or core component into which the external facing or cladding component is then inserted. The facing component has a thickness greater than the depth of the recess so that it will project above the top of the flanges defining the recess in the backing or core component. The assembly of components is then temporarily secured against separation by appropriate means such as clamping, either manual or mechanical, spot-welding or locally upsetting the flanges and the like. The assembly is then subjected to cold mechanical working which induces plastic deformation in the components causing the metal to flow therein so as to be urged or pressed against adjacent components in intimate contact or engagement in all adjacent areas with sufficient force to squeeze out all atmospheres such as air from between the components. Generally, such mechanical working is accomplished by partially reducing the thickness of the composite slab by normal cold rolling with sufficient pressures to obtain plastic deformation of the components laterally within the planes of the components and at 90° to the direction of rolling to obtain the required contact between adjacent areas.

In accordance with this invention, it is essential that the flanges resulting from the provision of the recess in the backing or core component have a correlation of width and height so that the metal of the projecting flanges will have a resistance to deformation less than the resistance to deformation of the facing or cladding component. In all cases, it is also essential that the height of the projecting flanges, and accordingly, the depth of the recess, must be restricted in dimension so that after the assembly of components is reduced in thickness by the aforesaid cold mechanical working the top of the flanges remains below the outer surface or top of the facing or cladding component. After the assembly of components have been mechanically worked in accordance with this invention it may be then heated to appropriate pressure welding temperatures and subjected to pressure welding operations such as forging between mill rolls.

Figure 1:
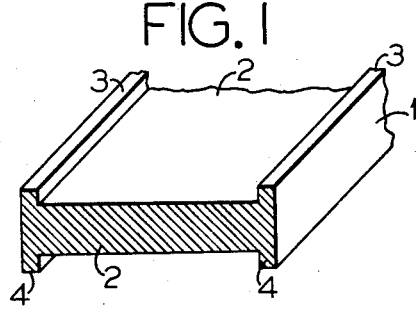
FIGURE 1 is a perspective view partly in section of a backing or core component employed in describing one embodiment of this invention.

More specifically, by reference to the drawings, FIGURE 1 illustrates a backing or core component 1 having shallow recesses 2 machined into two opposite faces thereof by any appropriate manner, such as milling and the like, to provide two pairs of flanges 3 and 4 projecting from lateral edges of the backing or core component 1. Generally this recess may, if desired, be machined with advantage in a face, or in a pair of opposite faces, of the metal when the core or base component is in the form of a cast ingot since the portion of the metal removed for formation of recess 2 would normally have to be removed in order to dispose of surface laps and folds, surface irregularities and impurities and the like. Generally this recess will not need to be any deeper than normally required to remove the aforesaid irregularities and impurities in the cast ingots.

After the backing or core cmponent has been prepared in the aforementioned manner a facing or cladding component 5 is inserted in each of the recesses having dimensions which fit between the projecting flanges defining the recess. Although not mentioned, it is to be understood that the adjacent surfaces of the core component and the facing component may be suitably prepared as required to pressure welding, for example, the components may be degreased or subjected to other surface treatments, such as wire brushing and the like. However, it is essential that the facing component 5 have a thickness greater than the height of the flange or depth of the recess, and the difference between them must be such that after the assembly of components is subjected to the necessary mechanical working in accordance with this invention the top of the flange will remain below the top or external surface of the facing component, when the assembly is subjected to a mechanical working of this invention in the form of a reduction in thickness by cold rolling. Therefore, the height of the flange must be restricted so that after plastic deformation thereof by the mechanical working of this invention, the ultimate height or top of the flange will not and cannot be flush with or project above the top or external surface of the facing or cladding component extending out of the recess of the backing component. This limitation with respect to height is essential so that the top of the flanges will not come into contact with the mill rolls employed in the cold rolling operation necessary in accordance with this invention.

Further, it is also essential to limit the thickness of the flange in conjunction with the limitations described above relative to its height so that the flange will be plastically deformable at lower pressures than the facing component. This is essential so as to prevent arching of the facing component away from the bottom of the recess. It is pointed out that the above limitation does not preclude plastic deformation of the facing component but the criterion pointed out is that the resistance of the metal in the flanges to deformation must be less than that of the facing component. It is necessary that the flanges offer less resistance to deformation than the facing component since if the reverse were true, the application of a steady pressure to the assembly would induce the facing component to plastically deform whereas the flange of the backing component would only involve or include elastic deformation resulting, after release of the rolling pressures, in partial recovery of the flanges to force the facing component to spring back or arch from the bottom of the recess of the base component.

As can be readily seen, the specific correlation of the dimensions of thickness and height of the flanges will necessarily be dependent on the type and condition of the metal in the various components, however such correlation can be readily determined by those skilled in the art from the physical properties and chemical composition of the components. For example, in the cladding of a 4½ inch thick by 16 inches wide core, a coarse grained brass with a fine grained brass, a recess ¼ inch deep and 16 inches wide may be appropriately machined, by milling and the like, in the face of the coarse grained brass to provide flanges having a height of ¼ inch and a thickness of ⅜ inch. A 16 inches wide and ½ inch thick sheet of the fine grained brass is inserted in the recess. An example of a coarse grain brass is an alloy having the following composition: electrolytic copper 99.9%, phosphorus 0.003% maximum, oxygen 0.05%, and impurities 0.03% total with each individual impurity being present in an amount not over 0.01%. Tyfine grain brasses are alloys within the following composition range; copper 92.0 to 94.0%, iron 2.05 to 2.60%, lead 0.03% maximum, tin 0.03% maximum, aluminum 0.02% maximum, other impurities 0.05% maximum with remainder zinc. In this combination of components the metal of the flanges projecting from the lateral edges of the core but ¼ inch below the top of the facing component will offer less resistance against plastic deformation than the metal of the facing component. Thus, when pressure is applied against the flanges to upset them they will plastically move against the edges of the facing component against which they will be molded in intimate contact therewith. Also, as a result of these differences in the resistance to plastic deformation, when pressure is applied by cold rolling transverse to the assembly of components so as to induce plastic deformation in the facing component, the lateral component of the deformation of the facing component will cause the flanges to be moved while being pliantly molded against the adjacent areas of the facing component resulting in the components mating into intimate contact with each other. Also, the lateral component of the deformation induced in the components will cause the adjacent faces of the components, bottom of recess and adjacent face of the facing component, to likewise be molded into intimate contact with each other. Such coordination between the adjacent areas is essential since it provides the desired squeezing action of metal against metal to bring them in the required intimate contact with each other for squeezing out all oxidizing atmospheres, such as air or other gases, between adjacent areas. This provides an important advantage in welding combinations of metals in which maximum avoidance of oxidation of surfaces to be joined is important. Also, the engagement of metal surface against metal surface in accordance with this invention provides a very effective mechanical seal against the entry of penetration of oxidizing atmospheres between the components.

Figure 2:
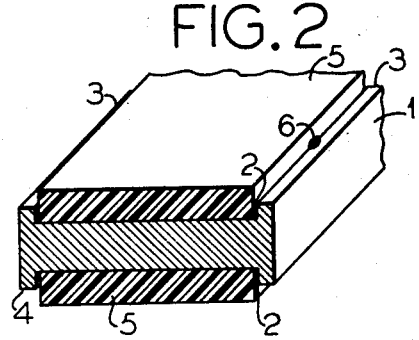
FIGURE 2 is a perspective view partly in section of an assembly of components which are to be unified together in accordance with the one embodiment of this invention.

After the facing component is assembled in the recess of the backing component, the assembly may be temporarily secured against disassembly or separation by any suitable means either by clamping, mechanical or manual, by local upsetting of the backing component against the facing component with an air hammer, by spot-welding, such as indicated at 6 in FIGURE 2, brazing, or any other appropriate method. The only requirement is that the assembled components be sufficiently secured together to permit subsequent handling without inadvertent disassembly prior to subsequent cold mechanical working of this invention.

In the preferred embodiment of this invention the secured assembly of components 7 is then passed between a pair of edging rolls 8 to upset the pairs of flanges 3 and 4 by bending them inwardly against the edge of facing component 5, with sufficient pressure applied against the flanges so as to induce plastic deformation of the metal therein to cause them to be molded sufficiently into intimate contact with the edges of the facing component so as to squeeze out all oxidizing atmospheres between them in accordance with the criterion pointed out above.

Figure 3:
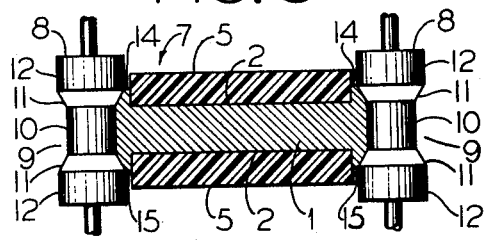
FIGURE 3 is an elevational view partly in section illustrating a mechanical working of the assembly of FIGURE 2 in accordance with the one embodiment of this invention.
Figure 4:
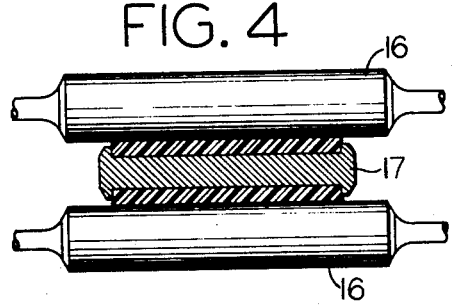
FIGURE 4 is a elevational view partly in section of a subsequent mechanical working of the assembly of FIGURE 2 in accordance with the one embodiment of this invention.
Figure 5:
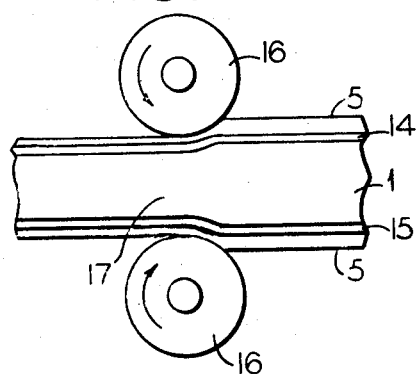
FIGURE 5 is a side view illustrating the mechanical working depicted in FIGURE 4.

The edging rolls illustrated in FIGURE 3 are conventional edging rolls provided with an annular groove 9 defined by a cylindrical surface 10, of reduced diameter, which merge into the outer periphery of the edging rolls, of greater diameter, by means of a conical surface 11 which slopes upwardly from the cylindrical surface 10 to the outer cylindrical surface 12 of rolls 8. As known in the art the major working portion of rolls 8 is a conical surface 11 which acts against the flanges leaving a bevel 13 at the tops of the flanges after urging them inwardly against the facing component 5 in the manner pointed out above. Of course, as will be understood, other rollers such as those described in U.S. Letters Patent No. 2,395,878 may be used if desired. As pointed out above, the height of the flange must be restricted so as to permit the metal in the flange to plastically deform in the plane of the edge rolling, during and subsequent such rolling, without the top of the deformed pairs of flanges 14 and 15, resulting from such edge rolling, reaching or projecting beyond the outer surface or top of the facing component. Further the difference between the top of the facing component and the top of the deformed flanges must be sufficient to allow for subsequent necessary reduction in thickness of the assembly, by cold rolling, to provide the intimate contact as pointed out in the criterion above without bringing the flange into contact with the rolls during cold rolling. As can be seen, if these limitations are not respected, contact of the cold rolls, subsequent to edge rolling, against the flanges will cause deformation therein reducing the effectiveness of the mechanical seal desired for the exclusion of external atmospheres.

Any time subsequent to the edge rolling, the edge rolled assembly of components 17 is then subjected to a cold reduction in thickness, in one or more passes, by rolling the assembly in a rolling mill comprised of a pair of conventional mill rolls 16. The reduction by cold rolling may be, if desired, employed in conjunction with edgewise cold reductions particularly where the base component is softer than the facing component provided that sufficient reduction is obtained in accordance with the criterion pointed out above to plastically move the components to mold their adjacent areas or surfaces together into sufficient intimate contact to squeeze out all oxidizing atmospheres between these adjacent areas.

Thus, in accordance with this invention, oxidizing atmospheres are removed from between the components together with the obtainment of a seal for excluding atmospheres against re-entry or penetration between the various components. This is particularly advantageous since it is possible to economically weld metals which at the present time can only be unified by more elaborate, and accordingly, more expensive methods. Further, the invention is also advantageous with respect to the unification of metals which are now economically unified since the reduction in oxidation obtained in accordance with this invention makes it either possible to reduce the temperature for pressure welding during hot rolling and/or reduce the amount of reduction required to obtain a satisfactory weld across the interface of the components and/or produce a stronger and therefore more satisfactory weld across the interface of the components. The invention has been described above with respect to the provision of flanges projecting only from the lateral edges of the base component since the flanges need extend only from the opposed edges of the base component without extending entirely around the edges thereof. However, it is to be understood if desired the flanges can extend completely around the edges of the base component. This may be readily understood from consideration of the effects of plastic deformation where the facing component is softer than the base component. As is well known, the effects of cold rolling will cause greater elongation in a facing component which is softer than the basic component, and where the initial components are of equal length the difference in elongation will cause the facing component to extend beyond the tail end of the base component. Therefore, by appropriate selection of the relative lengths, by means well known in the art, of the base component and the facing component, the resulting reduction will result in a mechanical seal being formed at the ends of the composite assembly by rolling the tail end of the facing component over the rear edge of the base component. In addition to providing a seal against re-entry or penetration of air between the components, the intimate contacting therebetween also provides against separation for subsequent handling.

After treatment of the assembly in accordance with the above, the cold rolled pack may be then welded together in accordance with conventional practices by heating to pressure welding temperatures and then welding all adjacent areas by hot rolling at the reductions required to produce the weld across the interface of the components. As will be understood such welding may be followed by any desired subsequent treatment of the welded assembly to the condition desired, including annealing and reduction to gauge. As is well known the conditions of temperatures and the reductions by hot rolling, to obtain the welding of the components, will vary for each individual application and for each combination of metal components, and the specific conditions required, of temperature and reduction, for pressure welding are known to the skilled in the art from conventional techniques presently in use. Where the assembly of components is treated in accordance with the invention as described above, pressure welding of the adjacent areas of the components is greatly facilitated by the removal and exclusion of air from between the components. In contrast, oxidizing atmospheres, such as air, remain between the surfaces of the components conventionally assembled during heating to pressure welding temperatures and up to the moment of hot rolling. The presence of such air necessarily results in some oxidation of the surfaces to be welded together, and by contrast, with the method of this invention, reduces the quality of the weld in addition to making the obtainment of a weld difficult. Although not specifically described, it is to be understood that if desired any of the well known fluxing materials which assist in ultimate welding of the components may be employed between the components.

After pressure welding the welded assembly may be appropriately trimmed for removal of the flanges which explains the reason why, when the base component is formed from an ingot as cast, there is no necessity for complete milling of the cast ingot other than in the recess portion.

Figure 6:
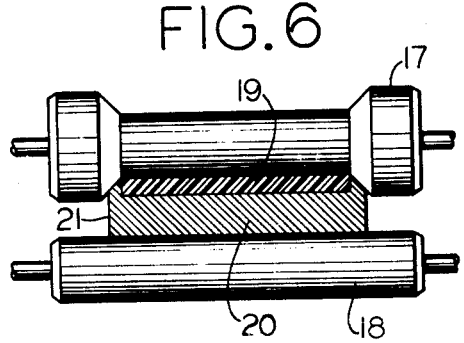
FIGURE 6 is an elevational view partly in section illustrating a mechanical working of an assembly of superimposed component sheets in accordance with another embodiment of this invention.

Although the mechanical working in accordance with this invention has been described above as comprising two distinct steps, it is to be understood that the two steps may be performed simultaneously, as for example, between a uniform roll 18 and an annularly grooved roll 19, illustrated in FIGURE 6, which edge rolls the flanges of the base component while simultaneously exerting pressure transverse the assembly to obtain the intimate contacting of the adjacent surfaces required for the removal of oxidizing atmospheres and to provide a mechanical seal, between the components, against re-entry or penetration of the atmospheres between the components. Also, as can be seen in FIGURE 6, the assembly of components 19 and 20 illustrates another embodiment of this invention in which only one face of base component 20 is clad with a facing component 19.

Although the two above embodiments described the preferred methods of mechanically working an assembly of components in accordance with this invention so as to include edge rolling of the flanges, FIGURE 7 illustrates a further embodiment within the scope of this invention illustrating the working of an assembly of components in the absence of edge rolling. This embodiment, of FIGURE 7, involves the rolling of an assembly of components having a facing component 22 disposed snugly between flanges 24 in a recess 23 provided in base component 25. The rolling is done between a pair of conventional mill rolls 26 under pressure sufficient to provide a reduction sufficient to cause the metal of the components to move in plastic deformation laterally and transversely in the assembly into the intimate contact prescribed by the criterion pointed out above. In this embodiment the depth of the recess 23 in base component 25, and accordingly the height of flanges 24, are also restricted to a dimension providing the required amount of plastic deformation, both at 90° to the direction of rolling and in the plane of rolling, to obtain the required intimate contact between the component, without the flange coming in contact with rolls 26. This requires, as above, that the height of flanges 24, in proper correlation with its thickness, must be such so that the top of the flange after mechanical working will remain below the top or outer surface of their respective facing components while obtaining the intimate contact required between the adjacent areas of the components.

It is to be understood that the above describes the basic process of this invention subject to various other alternatives and refinements within the scope of this invention as illustrated in FIGURES 8 to 11, all of which are intended to improve the effectiveness of the mechanical joint and the intimate contact obtained between the components. For example, as illustrated in FIGURE 8, a serrated face 28 may be generated on the inside of the flanges 29. Alternatively or in addition, the serrated edges 32 may be generated on the facing or cladding component 33. These serrations of the facing or cladding component may be generated on its edges in the course of milling or sawing the edges with appropriately designed tools well known in the art. Although serration has been specifically defined with respect to these specific embodiments, it is to be understood that the embodiments may take other forms which provide suitable knurling on one or both of the adjacent surfaces to give a more positive mechanical assembly in the course of mechanical working required by this invention.

Further, it is also pointed out that the use of additional means to facilitate the formation of a seal between various components may be also employed. For example, as illustrated in FIGURE 10, a thin narrow strip of soft material, such as a metal rod 34 may be inserted or otherwise disposed between the inside of the flange 35 projecting from the base or core component 36 and the adjacent edge of the facing component 37 at the time of initial assembly provided that its resistance to plastic deformation is less than that of the facing component 37. The function of this element is in the nature of a gasket seal formed as a result of the mechanical cold working of this invention. Alternatively, a wire rod having spring characteristics can be introduced between the flange and the facing component which will act, by means of elastic deformation, as a gasket to effect the required intimate contact with the components. A further variation of this invention is illustrated in FIGURE 11 which shows the use of a paste or plastic solid refractory material 38 which can be introduced between the flange 39 of the base or core ingot 40 and the edge of the facing component 41 at the time of the initial assembly of the components provided it effects the intimate contact of the components. Appropriate refractory material contemplated within the scope of the invention, but not limited thereto, are graphite, carbon, silica, kaolin and the like.

Although the invention has been described with respect to various embodiments, materials, and details, various modifications and changes will be apparent to one skilled in the art. For example, a pattern of stop-weld material may be interposed between the faces of adjacent sheets as in U.S. Letters Patent No. 2,690,002. Further, although the invention has been described with respect to bi-metallic assemblies, the invention is equally applicable to assemblies of components of the same metal, and to the formation and welding of various multi-component assemblies. Therefore, the invention is not to be limited by such embodiments, materials, and details except as set forth in the appended claims.

What is claimed is:

1. A method of removing and excluding atmospheres from between adjacent surfaces of components of a bi-metallic billet for subsequent unification by pressure welding comprising, forming in at least one of a pair of opposed faces of a base component of a first metal a depression disposed between flanges projecting from opposed lateral edges of said base component; forming an assembly by inserting in said depression a cladding component of a second metal different than said first metal and having a thickness greater than the height of said flanges, said depression being formed in said base component to provide said flanges of a thickness and height offering less resistance to plastic deformation than said cladding component when said assembly is subjected to the below described reduction in thickness by cold rolling with said height of said flanges being restricted in dimension so that after said cold rolling the top of said flanges remain below the top of said cladding component, the outer edges of said cladding component being adjacent the inner edges of said flanges; plastically deforming said components by subjecting said assembly to a reduction in thickness by said cold rolling with said deforming being sufficient to press said components into intimate engagement with each other in their adjacent areas with sufficient force to squeeze out all atmospheres and to form a seal between the outer edges of said cladding component and the inner edges of said flanges; and subsequently heating and rolling to pressure weld said components together.

2. The method of claim 1 wherein at least one of the adjacent surfaces between said flanges and said cladding component is knurled.

3. The method of claim 2 wherein the knurling is in the form of serrations.

4. The method of claim 1 including the step of inserting between the adjacent surfaces of said flanges and said cladding component a sealing component comprising a material having a resistance to plastic deformation below that of said cladding component.

5. The method of claim 4 wherein said sealing component is metal.

6. The method of claim 5 wherein said sealing component is a metal rod.

7. The method of claim 4 wherein said sealing component is comprised of refractory material.

8. The method of claim 7 wherein said refractory material is selected from the group consisting of graphite, carbon, silicate or kaolin.

9. A method for removing and excluding atmospheres from between adjacent surfaces of components of a bi-metallic billet for subsequent unification by pressure welding comprising, forming in at least one of a pair of opposed faces of a base component of a first metal a depression disposed between flanges projecting from opposed lateral edges of said base component, forming an assembly by inserting in said depression a cladding component of a second metal different than said first metal and having a thickness greater than the height of said flanges, said depression being formed in said base component to provide said flanges of a thickness and height offering less resistance to plastic deformation than said cladding component with said height of said flanges being restricted to a dimension so that after the below described mechanical working of said assembly the top of said flanges remain below the top of said cladding component, the outer edges of said cladding component being adjacent the inner edges of said flanges; plastically deforming said flanges against the adjacent edges of said cladding component sufficiently to press the adjacent areas of said flanges and said cladding components into intimate contact with each other; thereafter plastically deforming said components by subjecting said assembly to a reduction in thickness by cold rolling with said deforming of said assembly being sufficient to press said components into intimate engagement with each other in all their adjacent areas with sufficient force to squeeze out all atmospheres and to form a seal between the outer edges of said cladding component and the inner edges of said flanges; and subsequently heating and rolling to pressure weld said components together.

10. The method of claim 9 wherein said plastic deformation of said flanges is done simultaneously with said cold rolling.

11. The method of claim 9 wherein at least one of the adjacent surfaces between said flanges and said cladding component is knurled.

12. The method of claim 11 wherein the knurling is in the form of serrations.

13. The method of claim 9 including the step of inserting between the adjacent surfaces of said flanges and said cladding component a sealing component comprising a material having a resistance to plastic deformation below that of said cladding component.

14. The method of claim 13 wherein said sealing component is a metal.

15. The method of claim 13 wherein said sealing component is comprised of refractory material.

16. The method of claim 15 wherein said refractory material is selected from the group consisting of graphite, carbon, silicate or kaolin.

References Cited in the file of this patent

UNITED STATES PATENTS

| | | |
|---|---|---|
| 2,395,877 | Keene | Mar. 5, 1946 |
| 2,567,012 | Donelan | Sept. 4, 1951 |
| 2,697,954 | Sowter | Dec. 28, 1954 |
| 2,744,314 | Kinney | May 8, 1956 |
| 2,932,886 | Althouse | Apr. 19, 1960 |
| 2,961,761 | Watson et al. | Nov. 29, 1960 |
| 3,091,847 | Peters | June 4, 1963 |